(12) United States Patent
Franzen et al.

(10) Patent No.: US 7,410,339 B2
(45) Date of Patent: Aug. 12, 2008

(54) TRANSFER PLANT AND METHOD FOR LOADING AND UNLOADING CONTAINERS FROM CONTAINER SHIPS

(75) Inventors: Hermann Franzen, Mönchengladbach (DE); Joachim Kröll, Jüchen (DE)

(73) Assignee: Gottwald Port Technology GmbH, Duesseldorf (DE)

( * ) Notice: Subject to any disclaimer, the term of this patent is extended or adjusted under 35 U.S.C. 154(b) by 199 days.

(21) Appl. No.: 10/526,703

(22) PCT Filed: Aug. 28, 2003

(86) PCT No.: PCT/EP03/09511
§ 371 (c)(1),
(2), (4) Date: Oct. 3, 2005

(87) PCT Pub. No.: WO2004/033356
PCT Pub. Date: Apr. 22, 2004

(65) Prior Publication Data
US 2006/0182524 A1 Aug. 17, 2006

(30) Foreign Application Priority Data
Sep. 12, 2002 (DE) ................................. 102 44 116

(51) Int. Cl.
*B63B 27/00* (2006.01)
*B65G 67/60* (2006.01)
*B66C 11/12* (2006.01)

(52) U.S. Cl. ...................... 414/140.3; 212/318; 212/326

(58) Field of Classification Search ......... 414/560–561, 414/564, 140.3, 140.4, 139.8, 139.9, 141.6, 414/142.6, 141.3, 222.13, 622, 626, 940, 414/643, 659, 660, 662, 668–672; 212/312, 212/314–319, 324–327; 182/141, 142, 148, 182/149

See application file for complete search history.

(56) References Cited

U.S. PATENT DOCUMENTS 3,543,952 A * 12/1970 Young ..................... 414/140.3
4,546,852 A * 10/1985 Martin et al. ................. 182/12
5,775,866 A 7/1998 Hosler et al.
5,931,625 A 8/1999 Bauer et al.
2002/0031419 A1* 3/2002 Weis ....................... 414/140.3

FOREIGN PATENT DOCUMENTS

| DE | 3342849 A1 * | 6/1985 |
| JP | 61-267690 | 11/1986 |
| JP | 10330078 | 12/1998 |
| JP | 10330078 | 3/1999 |
| JP | 11278790 | 1/2000 |
| JP | 2000-143154 | 5/2000 |
| JP | 143154 | 10/2000 |
| WO | WO 9835905 A2 * | 8/1998 |

OTHER PUBLICATIONS

Search Report from International Application No. PCT/EP03/09511, dated Dec. 10, 2003.

* cited by examiner

*Primary Examiner*—Saul J. Rodriguez
*Assistant Examiner*—Gregory W Adams
(74) *Attorney, Agent, or Firm*—Van Dyke, Gardner, Linn & Burkhart, LLP

(57) ABSTRACT

The invention relates to a transfer plant, especially for loading and unloading ISO containers from container ships at seaports, comprising a vertical support which is propped up on the land side and on which a horizontal extension arm is braced. Said horizontal extension arm, along which a horizontal conveying device can be displaced, protrudes across the ship that is to be unloaded on the sea side. The horizontal conveying device cooperates with hoisting and lowering devices which pick up and put down the containers. The aim of the invention is to create a redesigned transfer plant and a method for loading and unloading containers, preferably ISO containers, from container ships in seaports, which allow the transfer rate to be significantly increased and consequently the lay times of the container ships at the pier to be substantially reduced. Said aim is achieved by disposing at least two horizontal conveying devices (9, 10) on the horizontal extension arm (1.4, 1.5, 1.6), which can be displaced independently of each other along said horizontal extension arm (1.4, 1.5, 1.6) between the hoisting and lowering devices (11, 13) that are located on the land side and the sea side. In addition, intermediate storage devices (12, 14), into which the containers can be placed and from which said containers can be picked up by the hoisting and lowering devices (11, 13) that are located on the land side and the sea side and the horizontal conveying devices (9, 10), are disposed on the horizontal extension arm in the area of the hoisting and lowering devices (11, 13) that are located on the land side and the sea side.

28 Claims, 12 Drawing Sheets

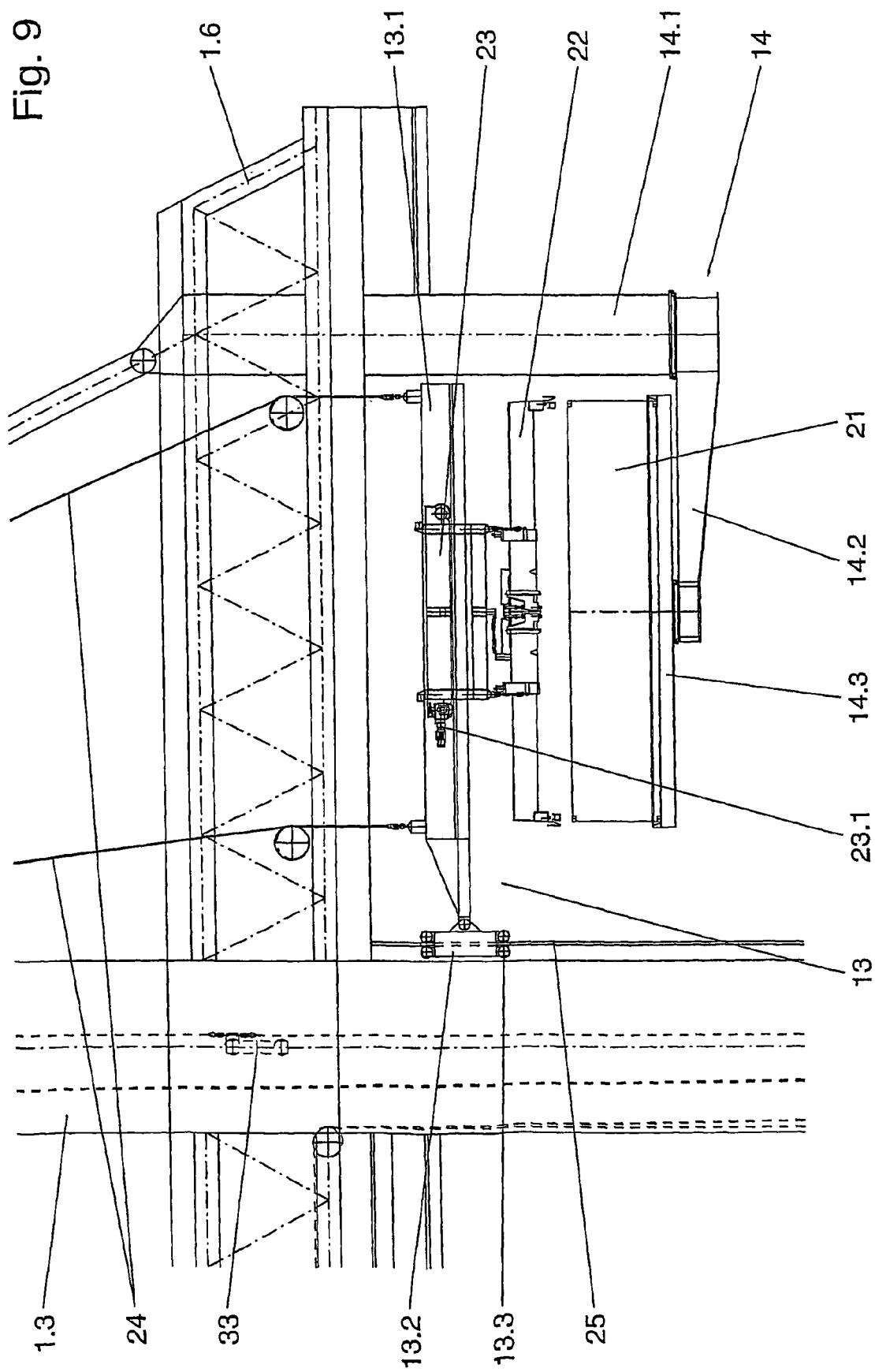

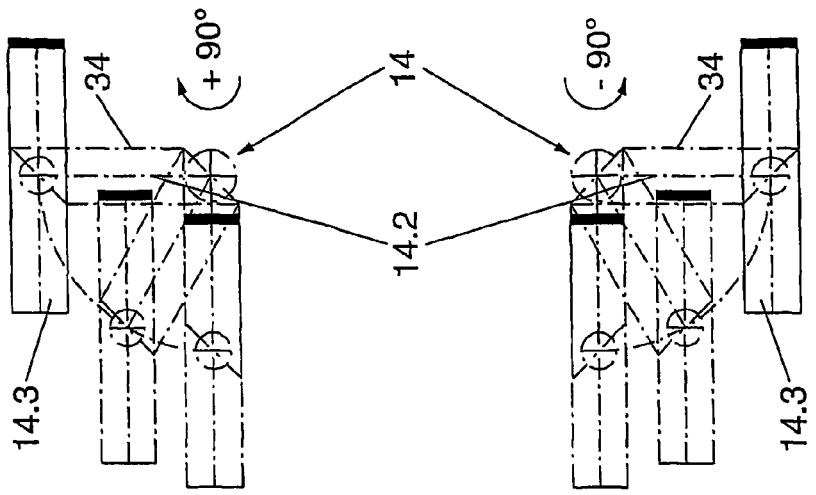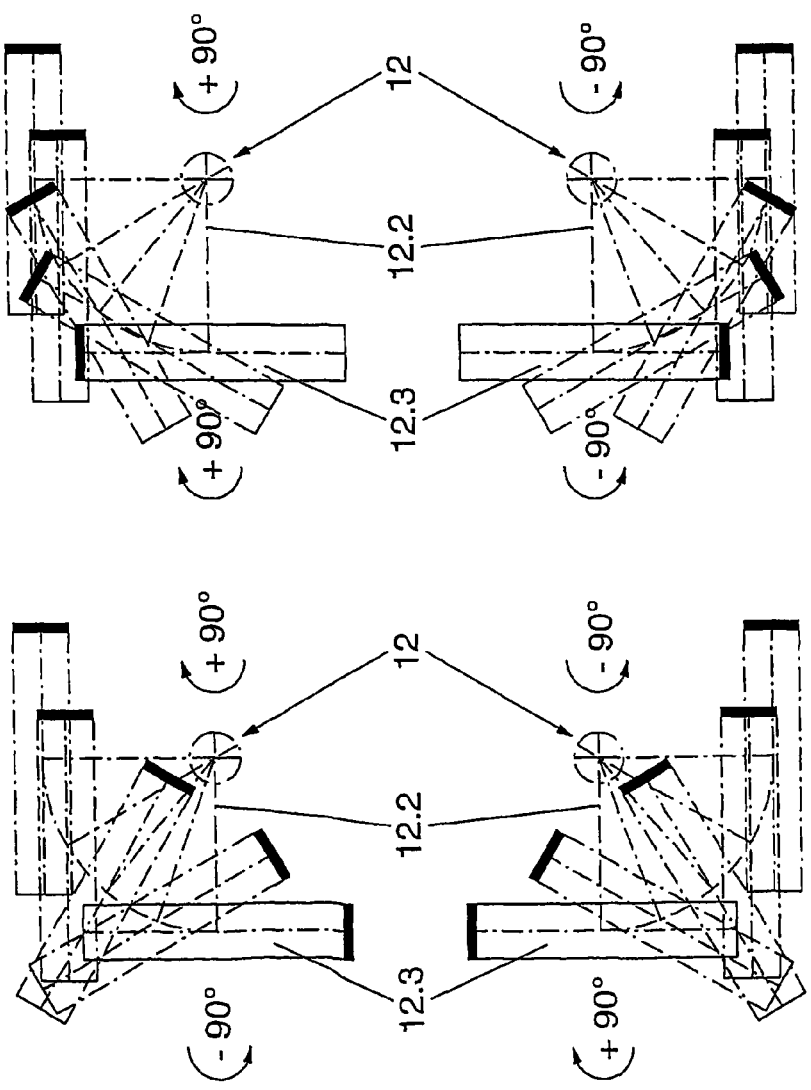

TRANSFER PLANT AND METHOD FOR LOADING AND UNLOADING CONTAINERS FROM CONTAINER SHIPS

BACKGROUND OF THE INVENTION

The invention relates to a transfer plant, especially for loading and unloading containers from container ships at seaports, with a vertical support which is propped up at the land side and on which a horizontal extension arm is braced, which protrudes across the ship that is to be unloaded on the sea side and along which a horizontal conveying device can travel, which cooperates with hoisting and lowering devices that pick up and put down the containers, being arranged at the land and sea side and also on the horizontal extension arm.

The invention also relates to a method for loading and unloading containers from container ships at seaports, making use of the aforesaid transfer plant.

A container transfer plant with the above described features is known, for example, from DE 40 40 072 A1. The known solution attempts to reduce as much as possible the lost time during the loading and unloading of container ships, which arises at full extension of the hoisting distance during the loading and unloading of the containers. It was recognized that the handling rate of a known system can be considerably abbreviated by appropriately shortening the hoisting and lowering distances.

The problem is solved in the state of the art by using a transport car for the heavy horizontal conveying in such a loading bridge, whose carrying platform is adjustable in height due to lengthwise adjustable carrying elements, so that the carrying platform can be adjusted optimally to the heights of the load transfer.

However, the hoisting and lowering events represent only one of many lost times, and a prime criterion for the handling capacity of the container bridge is first and foremost the duration of a load alternation of the crane trolleys. With increasing size of ship and, thus, increasing width of ship, the sea-side extension arm and thus the horizontal travel distance of the trolleys becomes increasingly longer, and this cannot be balanced out by higher speeds of travel of the trolleys. The maximum trolley travel speeds currently achieved in container bridges of around 4 m/s are on the order of magnitude just within the capabilities of the crane operators; any further increase in trolley speed is hardly feasible.

SUMMARY OF THE INVENTION

The purpose of the present invention is therefore to create a novel design of a transfer plant and a method for loading and unloading of containers, preferably ISO containers, from container ships at seaports, such that the handling performance can be significantly increased and thus the time spent by the container ship at dock can be substantially reduced. At the same time, one should make sure that the crane operator is no longer exposed to the great stresses that arise from the fast acceleration and deceleration and the high speeds of travel of the trolleys. In particular, one goal of the present invention is to automatically perform the overwhelming majority of the unloading and loading process.

The purpose is achieved by a transfer plant with the features of claim 1 and a transfer plant with the features of claim 3. In relation to the method of loading and unloading of containers, a solution is indicated in claim 17. Subsidiary claims 2, 4-16, 18 and 19 pertain to advantageous embodiments of the invention.

To achieve the purpose, the invention proposes that, in a transfer plant, especially for loading and unloading containers from container ships at seaports, with a vertical support which is propped up at the land side and on which a horizontal extension arm is braced, which protrudes across the ship that is to be unloaded on the sea side and along which a horizontal conveying device can travel, which cooperates with hoisting and lowering devices that pick up and put down the containers, being arranged at the land and sea side and also on the horizontal extension arm, an increased handling performance is achieved in that at least two horizontal conveying devices are arranged on the horizontal extension arm, which can travel independently of each other between the land-side and sea-side hoisting and lowering devices along the horizontal extension arm.

In an advantageous embodiment of the invention, intermediate storage devices are arranged on the horizontal extension arm in the region of the land-side and/or the sea-side hoisting and lowering devices, where containers can be put down or picked up by the land-side or sea-side hoisting and lowering devices, as well as the horizontal conveying devices. This accomplishes a decoupling of the load handling movements of the hoisting and lowering devices and of the horizontal conveying devices and thus achieves an optimization of the handling performance.

It is also proposed by the invention, as an alternative solution to the problem, that in a transfer plant, especially for loading and unloading containers from container ships at seaports, with a vertical support which is propped up at the land side and on which a horizontal extension arm is braced, which protrudes across the ship that is to be unloaded on the sea side and along which a horizontal conveying device can travel, which cooperates with hoisting and lowering devices that pick up and put down the containers, being arranged at the land and sea side and also on the horizontal extension arm, an increased handling performance is accomplished in that intermediate storage devices are arranged on the horizontal extension arm in the region of the land-side and/or the sea-side hoisting and lowering devices, where containers can be put down or picked up by the land-side or sea-side hoisting and lowering devices, as well as the horizontal conveying devices.

Such a transfer plant may be supplemented in that at least two horizontal conveying devices are arranged on the horizontal extension arm, which can travel independently of each other between the land-side and sea-side hoisting and lowering devices along the horizontal extension arm.

Thus, one peculiarity of the present invention is the separation between the hoisting and lowering of the device for picking up and putting down the containers, on the one hand, and the mechanisms for the horizontal conveying to the landward end of the transfer plant, on the other hand, which makes it possible for the time sequences of the hoisting and lowering operation to take place at the same time as, or overlapping in time with, those of the horizontal conveying. This improves the availability of the particular piece of equipment, i.e., assuming the two proposed horizontal devices, the hoisting and lowering operations can take place while the container is being conveyed along the traversing mechanism in the horizontal direction.

The horizontal extension arm may be divided into a rigid base arm at the sea side, a swivel arm joined to it at the sea side, and a rigid extension arm protruding at the land side; the rigid sea-side base arm and the rigid land-side arm are fastened to the vertical support, and the rigid sea-side base arm accommodates the sea-side hoisting and lowering device in the position of rest of the transfer plant, in which the sea-side swivel arm is swiveled upward.

Basically, the enhanced handling performance of the transfer plant may be accomplished in that the sea-side portion of the horizontal extension arm carries a railway for a trolley of the sea-side hoisting and lowering device, the land-side hoisting and lowering device is fastened at the land-side portion of the horizontal extension arm, and railways for the horizontal conveying devices are arranged on both sides next to the railway of the sea-side hoisting and lowering device and next to the land-side hoisting and lowering device and thus essentially along the entire horizontal extension arm.

A compact, in particular, a narrow construction of the transfer plant is achieved or maintained in that the vertical support is fashioned in the shape of a tower, the railway for the hoisting and lowering device ends in the region of the vertical support, and the railways for the horizontal conveying devices run laterally past the vertical support.

In another embodiment of the invention, the intermediate storage devices each comprise a downwardly extending support column, at whose lower end is attached a horizontal swivel arm, at whose end away from the support column is hinged a carrying frame, which can swivel both into the region underneath the sea-side or land-side hoisting and lowering device and into the region of the two horizontal conveying devices into corresponding pick-up and hand-off positions for the picking up or handing off of a container.

The sea-side swivel arm and the sea-side carrying frame can each swivel at least ±90° about their vertical axis, independently of each other.

On the other hand, the swivel mechanism of the land-side carrying arm and/or the land-side carrying frame can be driven by a parallelogram type coupler mechanism, so that the orientation of the container remains unchanged during the swivel motion.

The carrying frame for the container can be swiveled into a central swivel position between the two pick-up and hand-off positions in the region of the railways, where the container can be connected to or detached from the sea-side or land-side hoisting and lowering device.

In another embodiment, the horizontal conveying devices may each consist of a frame with a rail traversing mechanism that can travel on the railways, a hoisting mechanism and a spreader to receive the container which has been swiveled and positioned underneath the spreader.

A stable guidance of the hoisting beam of the land-side hoisting and lowering device may be accomplished in that it is configured as a lift guided on the vertical support. This lift consists of a trolley, guided on a horizontal hoisting beam, with a load suspension means for the container, the hoisting beam being suspended from hoisting cables and linked by a cross rail to guide rollers that can roll against the vertical support.

To at least partly compensate for the natural weight of the land-side hoisting and lowering device, the hoisting cables of the land-side hoisting and lowering device may be coupled to a mobile counterweight.

As the interface to a horizontal conveying system, a loading station may be provided that is arranged beneath the land-side hoisting and lowering device, having two pick-up and hand-off positions that can travel alternately underneath the hoisting and lowering device.

According to another feature, the transfer plant is characterized in that the transfer plant has a gantry type substructure, supported on rail traversing mechanisms, the extension arm protrudes across the substructure on the land side, and the vertical support is propped up centrally on the substructure at the land side.

A method of operation for the loading and unloading of containers from container ships by means of a transfer plant as described above is characterized by the sequence of the following work steps:

a) for the unloading from a container ship tied up at the dock, a container is picked up by a spreader of the sea-side hoisting and lowering device, which has been positioned on the horizontal extension arm above the container, and raised to a maximum hoisting height, b) the intermediate storage device arranged on the sea-side hoisting and lowering device, with a horizontally swiveling carrying arm and a horizontally swiveling carrying frame arranged on it, is swiveled from its position of rest underneath a railway of the two horizontal conveying devices into a position underneath the container, c) the container is placed down on the carrying frame and swiveled along with it under one of the two railways of the horizontal conveying devices, d) one of the horizontal conveying device[s] positioned above the container on the carrying frame receives the container and transports it to the end of the land-side extension arm, while the sea-side hoisting and lowering device picks up a new container, e) at the land-side end of the extension arm, the container is handed off to a carrying frame of a second intermediate storage device, having a downwardly extending support column, which has been swiveled by a horizontal swivel arm into the region of the railways of the horizontal conveying devices underneath the container, f) after detaching the container from the horizontal conveying device, the carrying frame with the container is swiveled under the hoisting mechanism of the hoisting and lowering device hinged to the land-side extension arm, where the container is picked up by a spreader, g) after the carrying frame swivels back, the container is lowered by the hoisting and lowering device and handed off to a horizontal conveying system on the ground, h) at the same time as the above-described work steps, a second container picked up by the sea-side hoisting and lowering device is transported by the second horizontal conveying device across its other railway to the end of the extension arm at the land side, where it is handled in the same fashion, and i) the above-mentioned work steps are performed in reverse sequence for the loading process.

The method of the invention may further be characterized in that the container oriented transversely to the lengthwise axis of the extension arm when picked up by the first hoisting and lowering device is swiveled into a predetermined position parallel to the extension arm by the carrying arm and/or carrying frame swiveling through +/−90°. As already described above, this orientation is useful for the exact positioning of the container, for example, with the container door facing the land side.

In another configuration of the invented method, it is proposed that the container oriented parallel to the extension arm when placed on the carrying frame of the second downwardly extending support column does not change its orientation when swiveled into the region of the vertical device due to opposite movements of the carrying arm and carrying frame.

Where the unloading of containers with the transfer plant of the invention has been described with the above features and work steps, it is expressly pointed out that the present invention may also extend to performing the above-described works steps in the reverse sequence in order to load a ship with containers.

With the above-described transfer plant, the handling capacity of a container bridge is substantially improved. Thanks to the improved handling capacity, the dock time of a container ship and thus the docking costs can be reduced by around 30-35%. The majority of the loading and unloading operations according to the invention can be done automatically by controlling the above-described operations in the appropriate manner and proper sequence.

The mode of operation of the present invention and its benefits shall be best described and explained by means of the drawing.

BRIEF DESCRIPTION OF THE DRAWINGS

FIG. 9 is another detail from FIG. 1,

FIGS. 10a, b are respective diagrams of the swivel mechanism and the swivel process, FIG. 11 is a diagram of the swivel mechanism and the swivel process.

DETAILED DESCRIPTION OF THE PREFERRED EMBODIMENT

Figure 1:
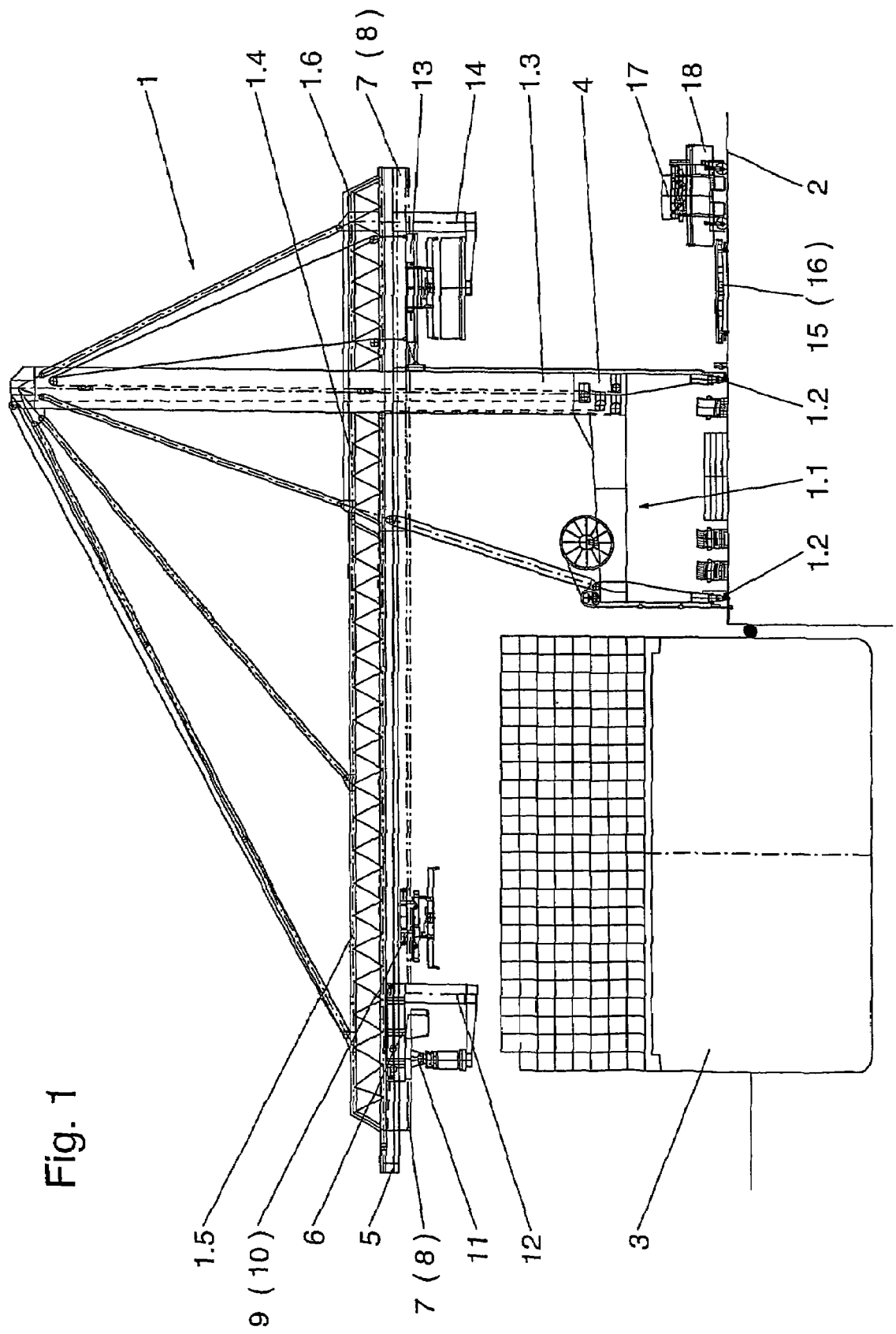
FIG. 1 is a side elevation of a transfer plant according to the invention.

FIG. 1 shows a transfer plant 1 with a container ship 3 lying at dock 2. The transfer plant 1 consists primarily of a gantry 1.1, which rests on the dock by four multiple-wheel rail traversing mechanisms 1.2, a tower type vertical support 1.3, and a horizontal extension arm 1.4, 1.5 and 1.6, fastened to it. This extension arm consists of a rigid base arm 1.4 at the sea side, a swivel arm 1.5 mounted on it at the sea side, and a rigid extension arm 1.6 at the land side.

The cable winches and drive unit 4 of the transfer plant are arranged in the cross beam 1.7 of the gantry 1.1 at the land side. The two extension arms 1.4 and 1.5 at the sea side carry at an upper level of their underside a railway 5 for a trolley 6 and, to the side of that on a lower level, at least one railway 7 and 8 for a horizontal conveying device 9 and 10. The railway 5 of the trolley 6 ends at the vertical support 1.3, but the railways 7 and 8 are continued past the side of the vertical support 1.3 until the end of the extension arm 1.6 on the land side. In addition to a conventional cable hoisting mechanism of a hoisting and lowering device 11 for containers 18, the trolley 6 contains a swivel mechanism 12 for the container 18.

At the landward side of the tower like vertical support 1.3 is another vertical hoisting device 13, which like the hoisting and lowering device 11 also has a swivel mechanism 14. On the dock 2 beneath the vertical hoisting mechanism 13 one notices two container loading stations 15 and 16, as well as a driverless transport vehicle (FTF) 17 hauling away a container 18.

Figure 2:
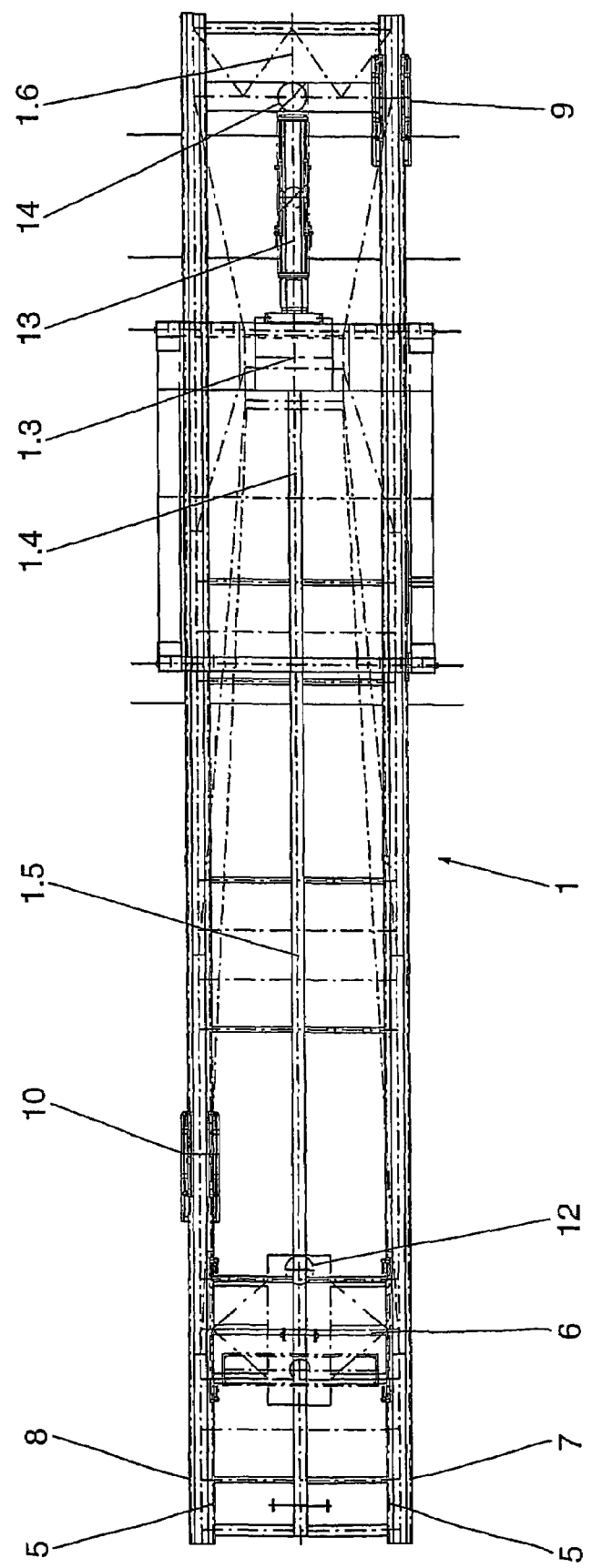
FIG. 2 is a top plan view of the transfer plant.

In FIG. 2, identical parts have identical numbering. FIG. 2 shows a top view of the transfer plant 1 with its vertical support 1.3, the rigid base arm 1.4 at the sea side, the swivel arm 1.5 mounted on it at the sea side, and the rigid extension arm 1.6 at the land side. One likewise notices that the railways 7 and 8 for the two horizontal conveying devices 9 and 10 are arranged at the side next to the railway 5 of the trolley 6 and travel for the entire length of the extension arm 1.4, 1.5 and 1.6. Thus, at the transition between the sea-side base arm 1.5 and the land-side extension arm 1.6, the railways 7 and 8 run at the side next to the central vertical support 1.3. The vertical support 1.3 is braced in the middle of the cross beam 1.7 on the land side and has a width, looking in the lengthwise direction of the cross beam 1.7, somewhat less than a third the length of the cross beam 1.7. The towerlike vertical support 1.3, unlike the otherwise boxlike vertical supports with two vertical beams running parallel to and at a distance from each other, is configured as a so-called monobeam, and thus with a central vertical beam that supports most of the load. One can also see that the vertical hoisting device 13 with the swivel mechanism 14 are arranged fixed in the middle region of the extension arm 1.6 on the land side.

Figure 3:
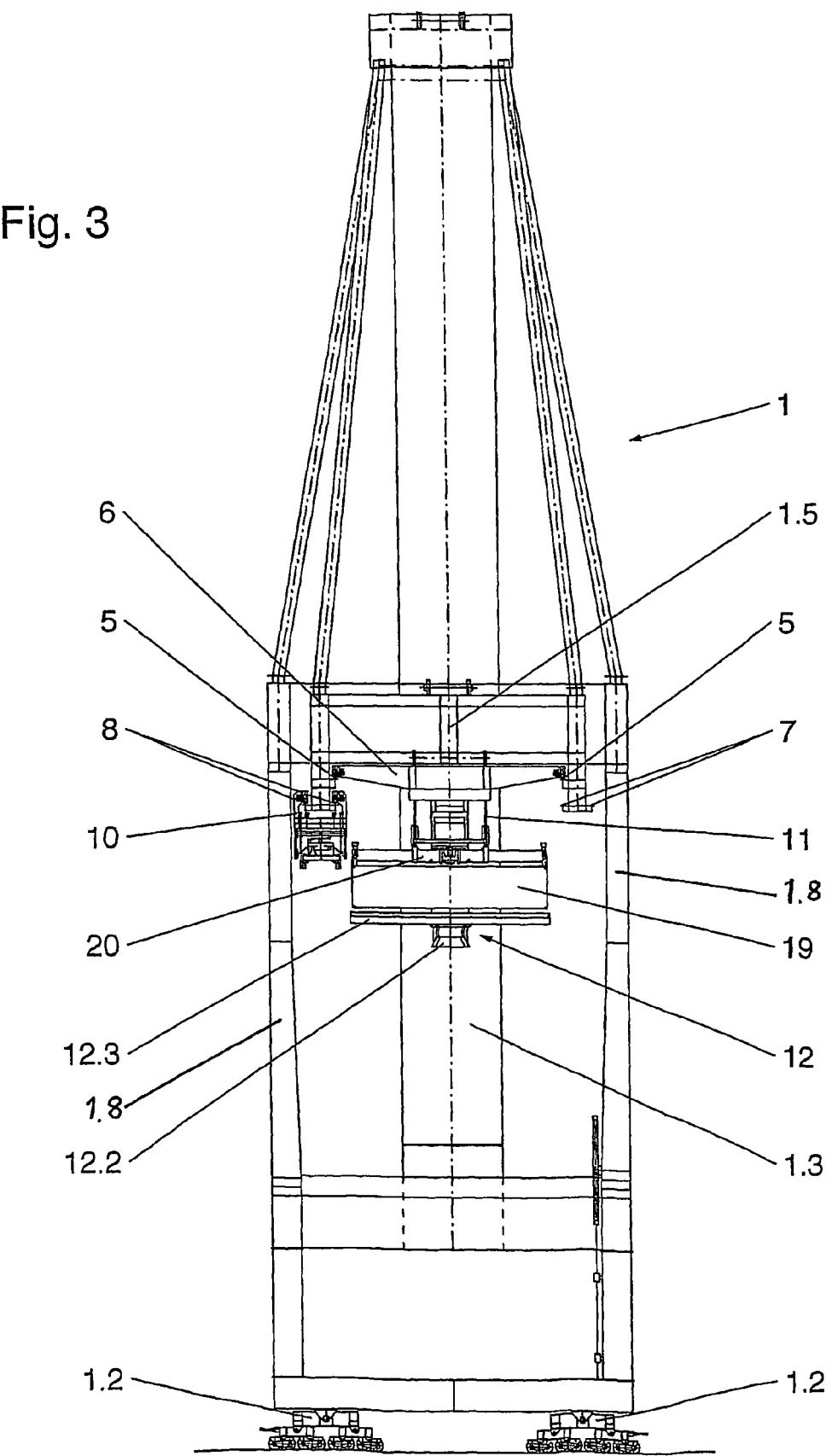
FIG. 3 is a front view of the transfer plant.

FIG. 3 shows a front view of the transfer plant of the invention, i.e., looking from the sea side toward the dock 2. In order to pick up another container 19, the hoisting and lowering mechanism 11 is provided with a spreader 20. The swivel mechanism 12 consists of a support column 12.1, including a first swivel unit (not shown), the swivel arm 12.2 including a second swivel unit (not shown), and a carrying frame 12.3. The support column 12.1 is displaced sideways on the trolley 6 next to the hoisting and lowering mechanism 11 and also centrally suspended between the two railways 7 and 8. Adjoining the vertical support column 12.1 via the swivel unit (not shown) is the horizontally extending swivel arm 12.1, which protrudes out to the side from the support column 12.1. At the end of the swivel arm 12.2 away from the support column 12.1 is fastened the second swivel unit, not shown, bearing the carrying frame 12.3, which can swivel about a vertical swivel axis. The carrying frame 12.3 is used to pick up a container 19 from, or hand one off to, the hoisting and lowering mechanism 11. In FIG. 3, the swivel arm 12.2 is in the 0° position, i.e., parallel to the lengthwise axis of the transfer plant 1 or its extension arm 1.4, 1.5 and 1.6. The carrying frame 12.3, swiveled by 90° about the swivel arm 12.2, stands ready to receive the container 19, which is suspended from the spreader 20.

Figure 4:
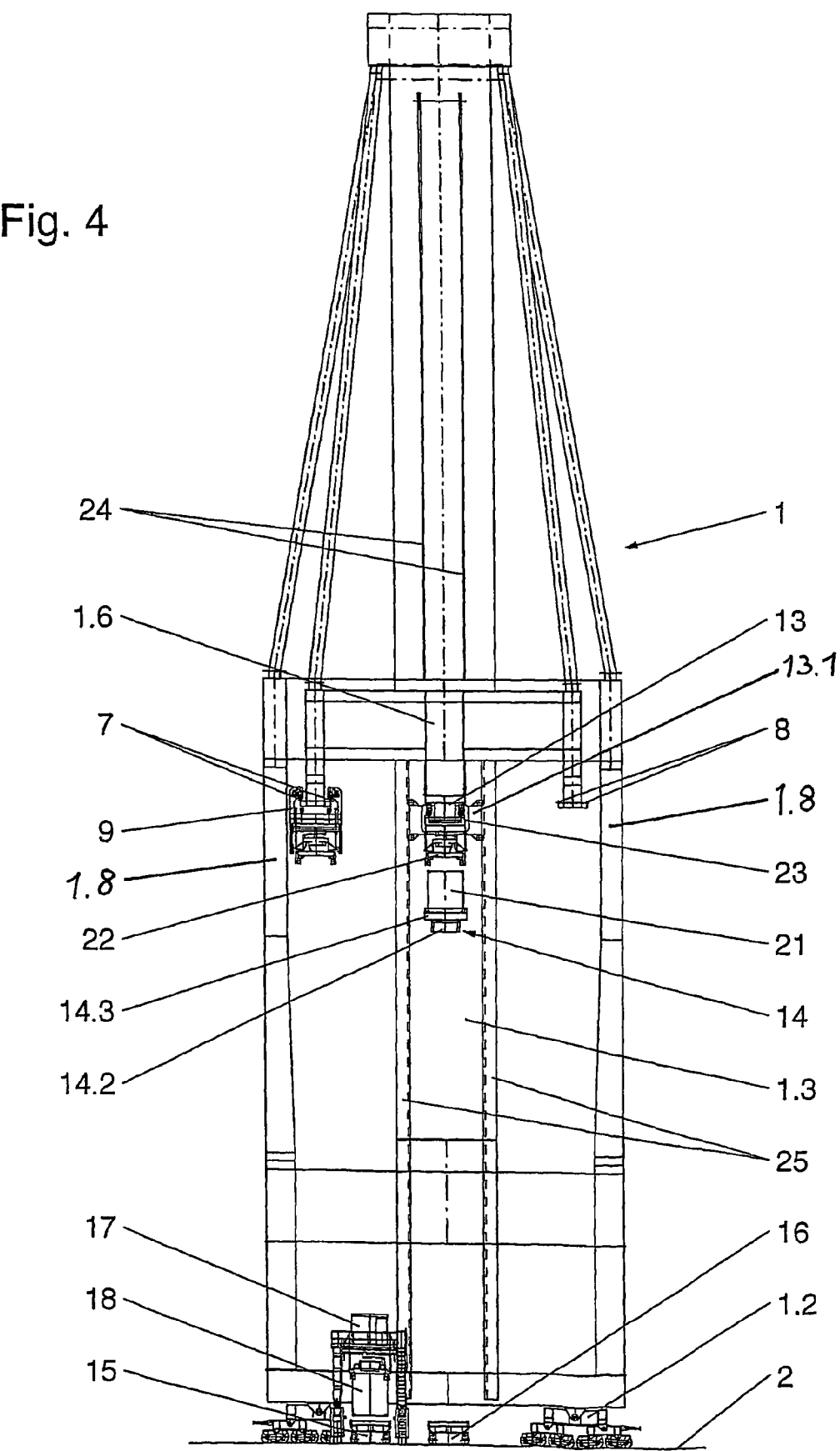
FIG. 4 is a back view of the transfer plant.

FIG. 4 shows the transfer plant 1 in rear view, i.e., looking from the dock 2 out to sea, showing essentially the vertical hoisting device 13 with the swivel mechanism 14. Here as well, one can notice a spreader 22, which serves to pick up another container 21 and is suspended via a trolley 23 to a hoisting beam 13.1 of the vertical hoisting mechanism 13. The trolley 23 can travel along the hoisting beam 13.1. The hoisting beam 13.1 is attached via load cables 24, which are not guided in the region of the upper end of the vertical support 1.3, to a hoisting unit (not shown), arranged on the cross beam 1.7. A stable guidance of the hoisting beam 13.1 is provided by the two guideways 25, which run vertically and parallel to the vertical support 1.3. The swivel mechanism 14, like the swivel mechanism 12, consists of a support column 14.1, including a swivel unit, a swivel arm 14.2, and a carrying frame 14.3 for the container 21. The construction and mode of operation of the swivel mechanism 14 concur with that of the swivel mechanism 12. Therefore, we refer here to the corresponding description of the swivel mechanism 12. In the present drawing, the swivel arm 14.2 and the carrying frame 14.3 loaded with the container 21 are in the 0° position, i.e., parallel to the lengthwise axis of the transfer plant 1. One also notices here the two loading stations 15 and 16 on the dock 2 underneath the vertical hoisting device 13, as well as an FTF 17 hauling away the container 18.

Furthermore, it is evident from FIGS. 3 and 4 that what is meant by the invention's designation of the vertical support 1.3 as being like a tower is that the extension arm 1.4, 1.5, 1.6 is essentially carried by a single vertical support 1.3, which is situated centrally to the width of the extension arm 1.4, 1.5, 1.6. The auxiliary supports 1.8 arranged on either side of the vertical support 1.3 merely have a stabilizing function in relation to the vertical support 1.3. The auxiliary supports 1.8 extend from the top end of the gantry 1.1 to the extension arms 1.4, 1.6. FIGS. 3 and 4 clearly show that, because of their function, the auxiliary supports 1.8 also have only a slight width as compared to the vertical support 1.3 and therefore do not increase the width of the transfer equipment 1, yet still leave enough room from the vertical support 1.3 for the horizontal conveying devices 9 and 10 with the containers being carried to move past on the auxiliary supports 1.8.

Figure 5:
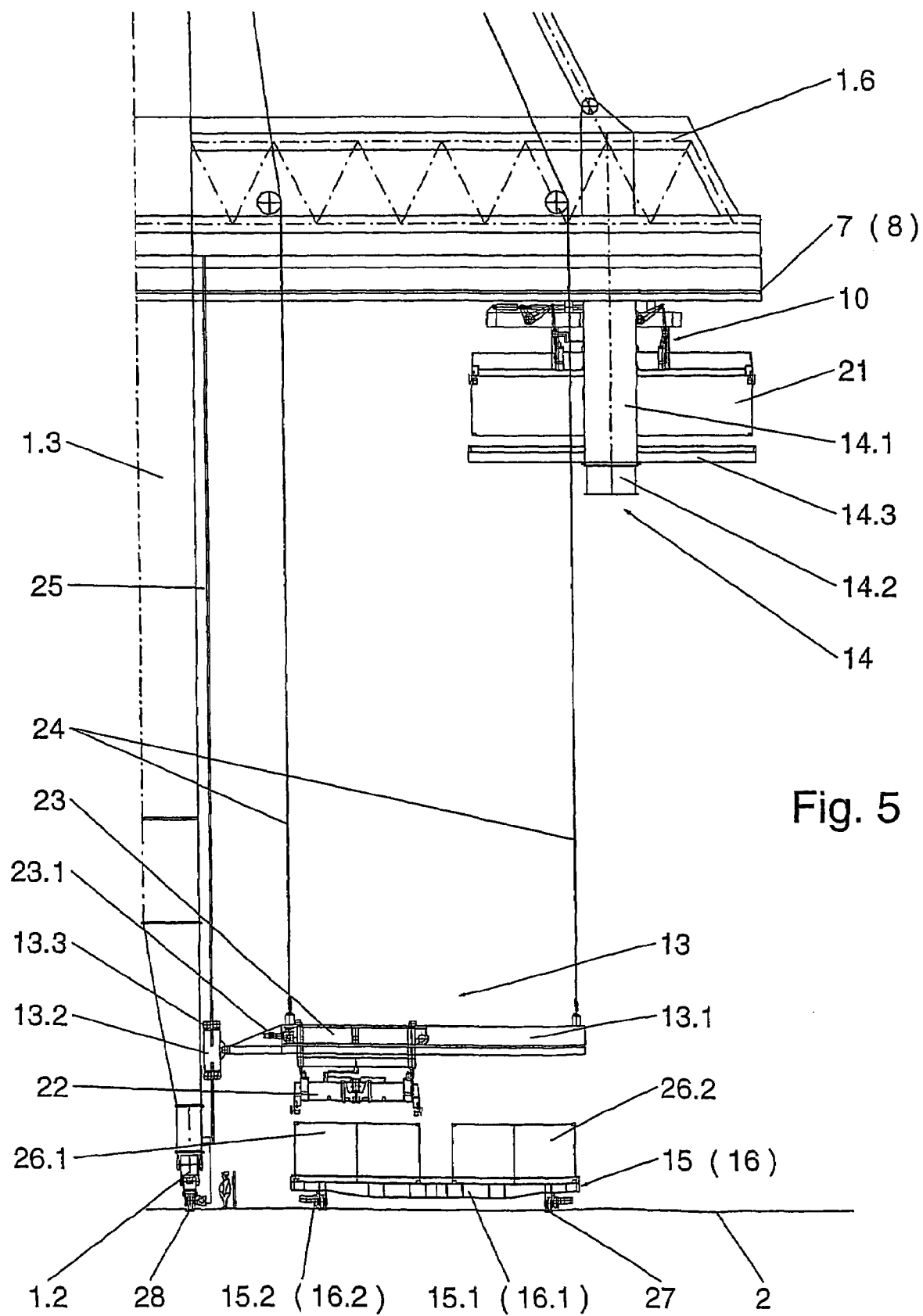
FIG. 5 is a cutout from the side view at the vertical conveying device.

FIG. 5 shows, in side view, the landward end of the transfer plant 1 in an enlarged view. The swivel arm 14.2 is located in a +90° position, i,e., at right angles to the lengthwise axis of the land-side extension arm 1.6, while the carrying frame ready to recieve the container 21 is in the 0° position, i.e., positioned parallel to the lengthwise axis and underneath the railway 8. The spreader 22, which is suspended from the hoisting beam 13.1 of the vertical hoisting device 13, serves to pick up a container 26.1. The vertical hoisting device 13 is attached to the load cables 24 by the lengthwise beam 13.1. For stable load guidance, there are two guideways 25, which run parallel to the vertical support 1.3. The guideways 25 form running tracks for the guide rollers 13.3, mounted in a cross beam or a balancing arm 13.2. The balancing arm 13.2 equalizes any minor differences in the lengths of the load cables 24 here.

FIG. 5 shows a twin-lift operation with two 20-foot ISO containers. The trolley 23, outfitted with a rail traversing mechanism 23.1 for a short horizontal extension of around +/−25 ft., is located in an off-center position above the 20-foot containers 26.1, which are stored in a 45-foot grid. The spreader 22, telescoped to the 20-foot stop setting, is ready for the first handling operation. In the next hoisting operation, the second 20-foot container 26.2 will be handled. The container loading stations 15 and 16, as a load hand-off mechanism, form the interface between the vertical hoisting device 13 of the transfer plant 1 and the horizontal conveying system. The container loading stations 15 and 16, consisting of a chassis 15.1 or a chassis 16.1 and two rail traversing mechanisms 15.2 and 16.2 apiece, can travel horizontally on rails 27, which are laid on the dock 2 in parallel with the rails 28 of the transfer plant 1.

Figure 6:
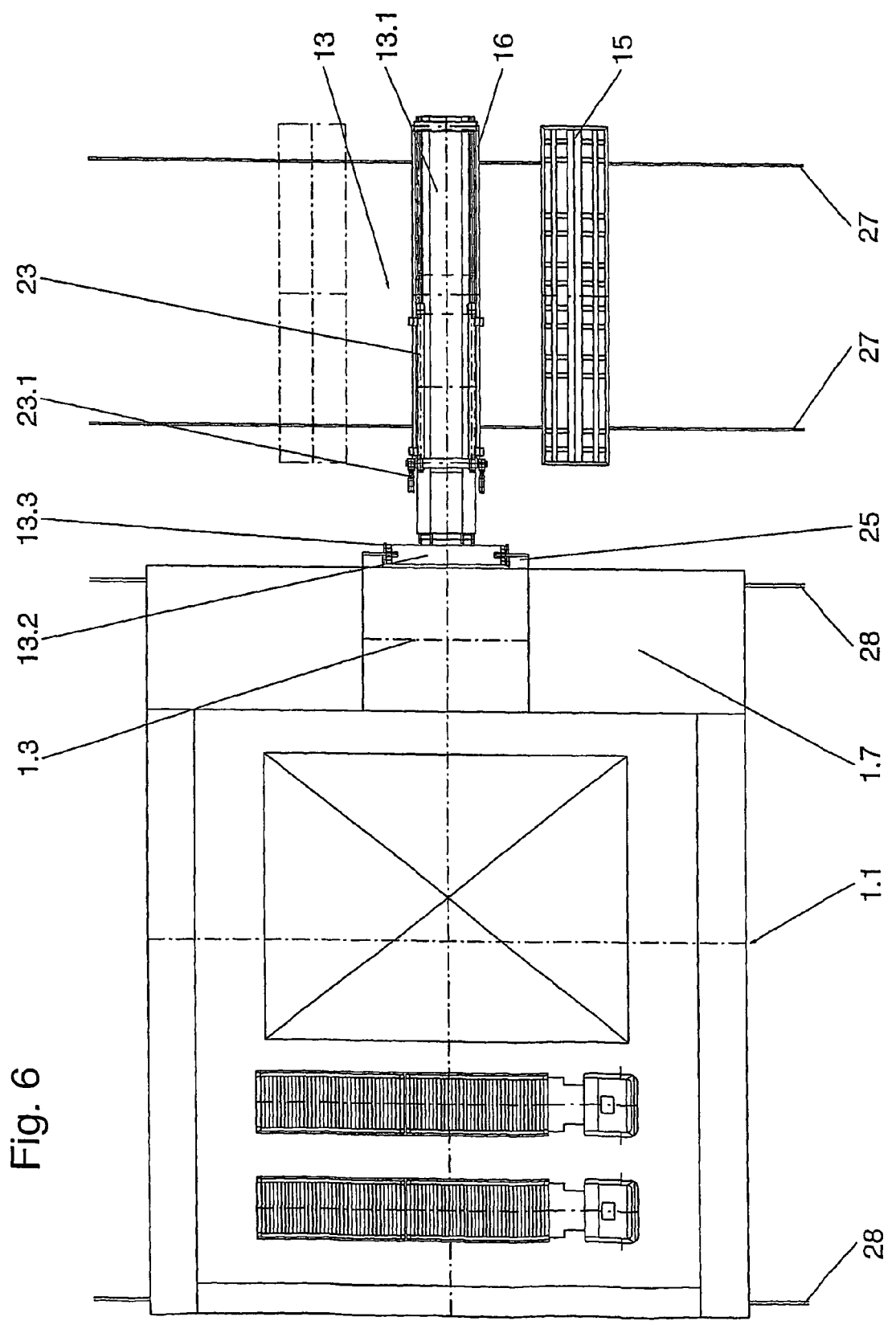
FIG. 6 is a top plan view of the vertical hoisting device.

FIG. 6 shows the vertical hoisting device 13 in a top view. One recognizes the gantry 1.1, the vertical support 1.3, the cross beam 1.7 at the land side, the vertical hoisting device 13, the lengthwise beam 13.1, the balancing arm 13.2, the guide rollers 13.3, the trolley 23 with its rail traversing mechanism 23.1 and the two railways 25, the container loading stations 15 and 16 on their rails 27, as well as the rails 28 of the transfer plant 1. The two container loading stations 15 and 16, controlled by a horizontal offset of around +/−6 m and monitored by an executive terminal logic, alternately occupy the total of three positions, once underneath the hoisting and lowering device 13 or the positions of the two hand-off stations to the FTFs 17, each of them being displaced sideways.

Figure 7:
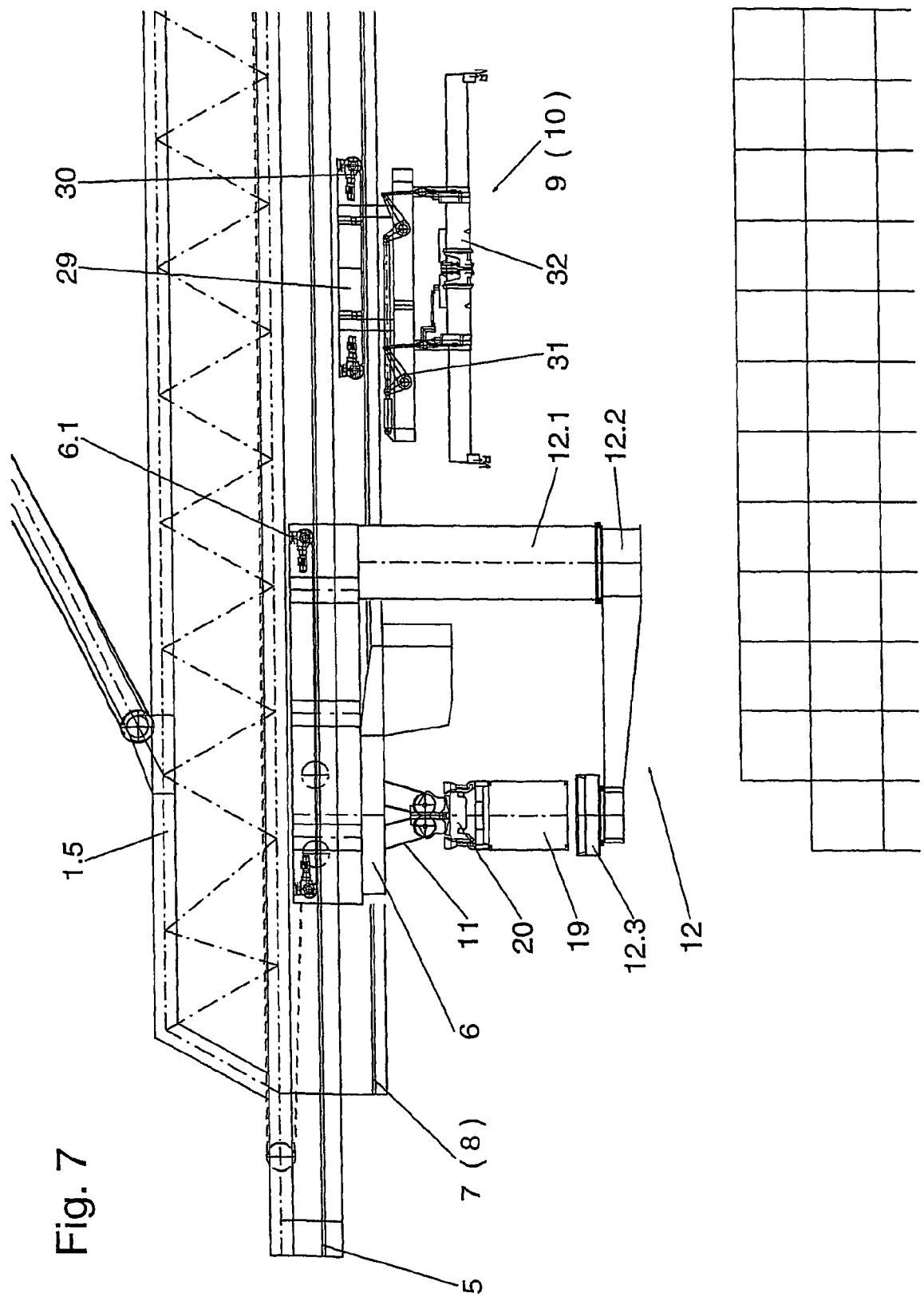
FIG. 7 is a detail from FIG. 1.

FIG. 7 shows, as a detail of the transfer plant 1, the sea-side swivel arm 1.5, the railways 5 of the trolley 6 and, to the side from these and on a lower level, the railways 7 and 8 for the two horizontal conveying devices 9 and 10. Additional components of the trolley 6 are the rail traversing mechanism 6.1, the cable hoisting unit 11, and the swivel mechanism 12. The latter consists of the bearing column 12.1 including swivel unit, the swivel arm 12.2 including swivel unit, and the carrying frame 12.3. As represented in the drawing, the swivel arm 12.2 is in the 0° position, i.e., parallel to the lengthwise axis of the transfer plant 1. The carrying frame 12.3 underneath the load, shifted by 90° from the swivel arm, stands ready to receive the container 19, which is suspended from the spreader 20. The horizontal conveying devices 9 and 10 consist of a trolley, known as a frame 29, with a rail traversing mechanism 30 and a hoisting mechanism 31 with a spreader 32 suspended from it.

Figure 8:
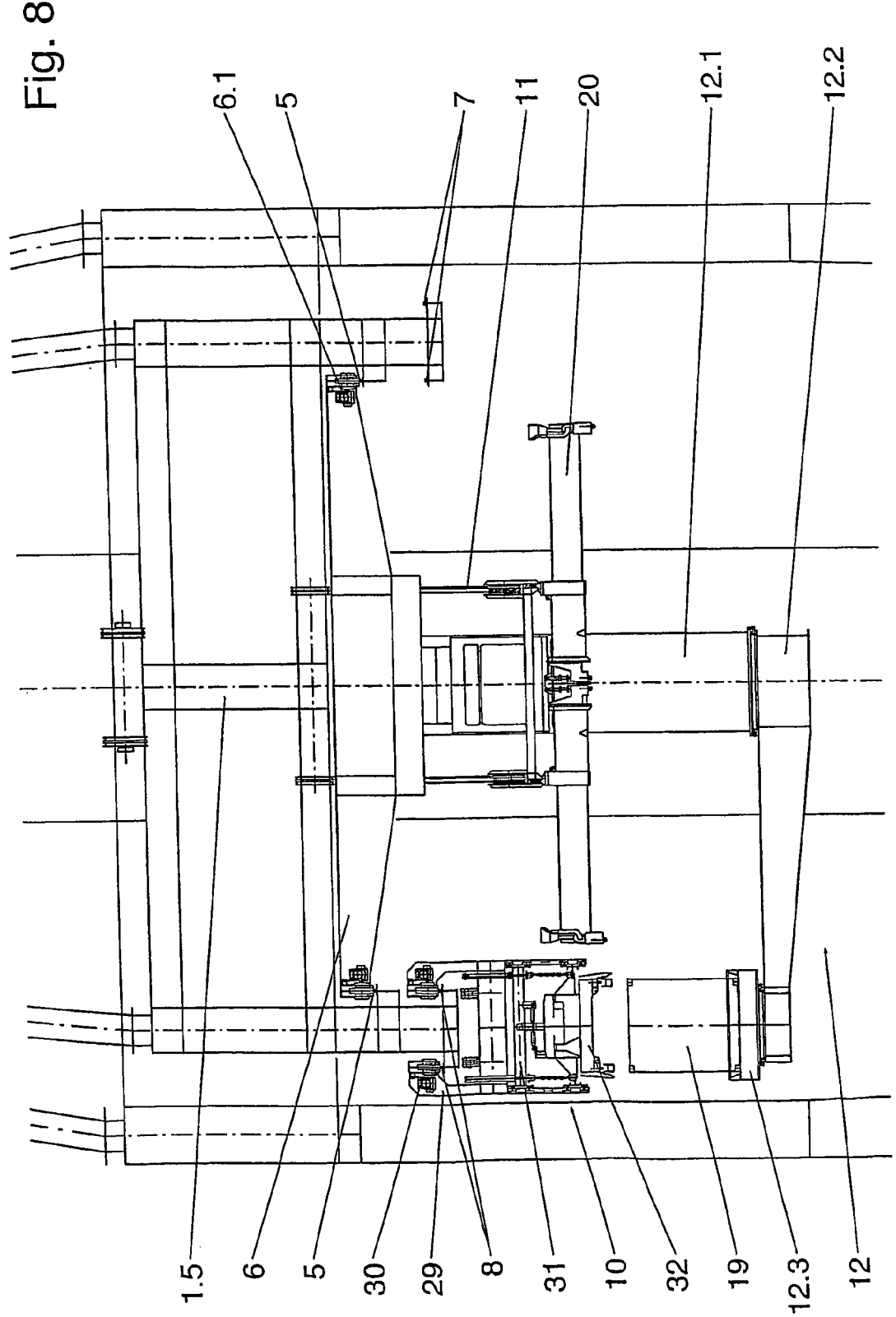
FIG. 8 is a detail from FIG. 3.

FIG. 8 shows in another frontal view the sea-side swivel arm 1.5 of the transfer plant 1. The swivel mechanism 12 consists of the bearing column including swivel unit 12.1. As represented in the drawing, the swivel arm is in the +90° position, i.e., swiveled by 90° relative to the lengthwise axis of the transfer plant 1. The carrying frame 12.3 loaded with the container 19, swiveled by 90° relative to the swivel arm, is parallel with the railway 8. The spreader 32 is ready to handle the container. The cable hoisting mechanism 11 of the trolley can begin the next lift.

FIG. 9 shows the vertical hoisting device 13 at the landward side of the vertical support 1.3, as well as the swivel mechanism 14. The swivel arm 14.2 and the carrying frame 14.3 loaded with the container 21 are situated in a 0° position, i.e., parallel to the lengthwise axis of the land-side extension arm 1.6. The spreader 22, which is suspended from the trolley 23, is used to pick up the container 21. In the situation shown here, the trolley 23, which can travel with its rail traversing mechanism 23.1, occupies a middle position. The proper weight of the vertical hoisting device 13 is at least partly compensated by a mobile counterweight 33, connected to the load cables 24, so that a corresponding reduction in the drive power is feasible.

FIGS. 10a and 10b show in schematic representation the swivel process of the swivel mechanism 12, starting from a 0° position, i.e., the swivel arm 12.2 is parallel with the sea-side swivel arm 1.5. The construction of the swivel mechanism 12 is organized such that two swivel units with independent drive, yet operating in coordination, determine the swivel process. The first swivel unit swivels the swivel arm 12.2 through +90° or −90°. The swivel movement toward the railway 7 or 8, controlled and monitored by an executive terminal logic system, is dictated by the subsequent operation of the horizontal conveying device 9 or 10 (container mover). The swivel arm 12.2 is used to turn the carrying frame 12.3 and, thus, also the container by an additional +90° or −90° about its vertical axis. With this extra function of the swivel mechanism 12, the attending personnel of the transfer plant can perform an orientation of the doors of the container or its heavily marked front ends, when needed.

FIG. 11 shows, in schematic representation, the swivel process of the swivel mechanism 14 starting from a 90° position, i.e., the swivel arm 14.2 is swiveled by 90° relative to the lengthwise axis of the transfer plant and the carrying frame 14.3 stands parallel with the railway 7 or 8. The construction of the swivel mechanism 14 is organized such that only one swivel unit determines the swivel process. The swivel unit swivels the swivel arm 14 by +90° or −90°. The swivel direction toward the railway 7 or 8, controlled and monitored by an executive terminal logic system, is dictated by the subsequent operations of the horizontal conveying device 9 or 10. Thanks to a parallelogram type coupler mechanism 32, arranged between bearing column and carrying frame, the guided carrying frame does not change its orientation. The same thus holds for the definite position of the container doors or the heavily marked front ends of the container in the swivel mechanism 12.

Figure 12:
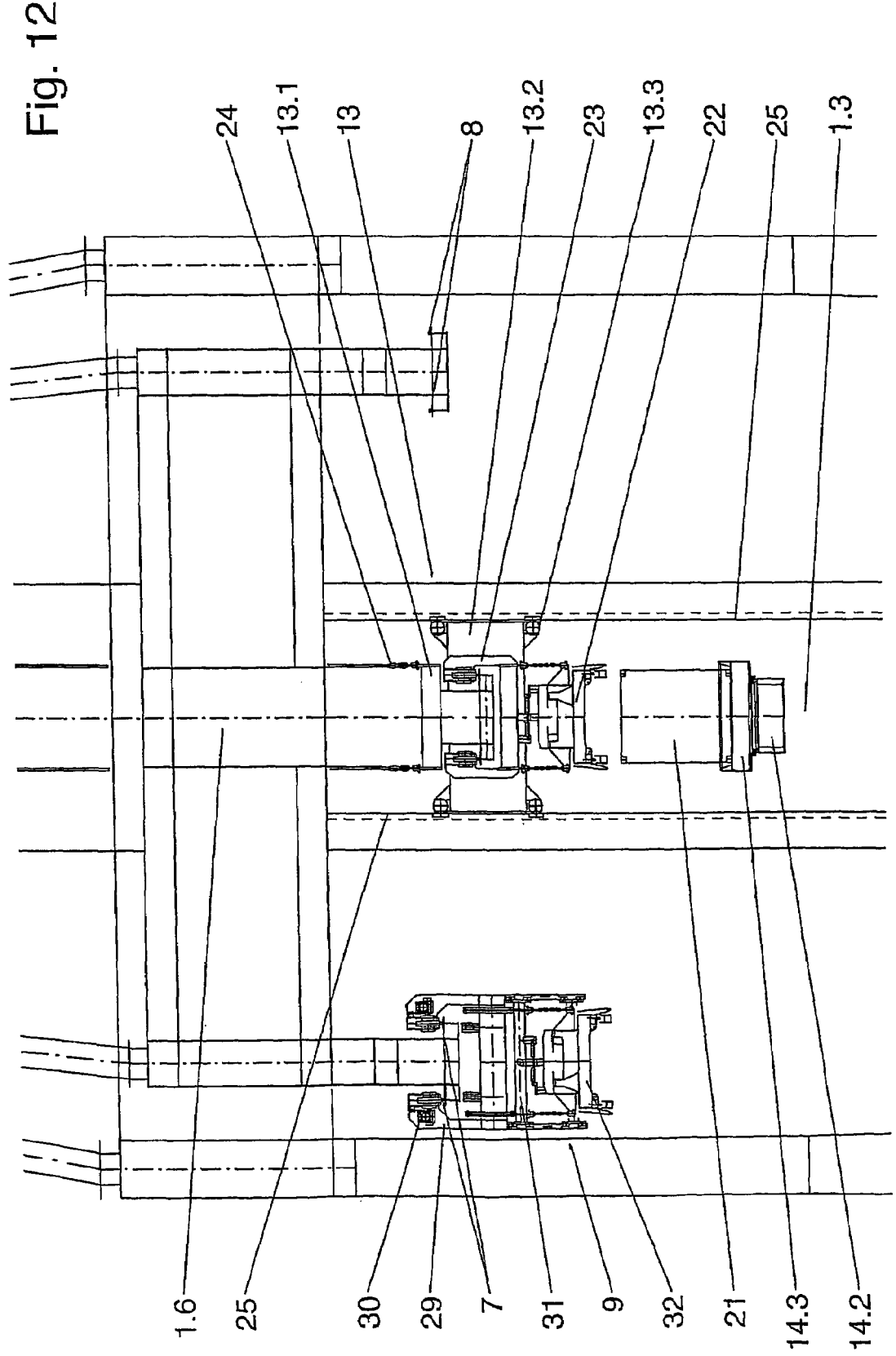
FIG. 12 is a back view of the transfer plant.

FIG. 12 shows the transfer plant in a back view, i.e., looking from the dock 2 out to sea. In the figure shown here, the swivel arm 14.2 and the carrying frame 14.3 including the load 21 are in a 0° position, i.e., parallel with the lengthwise axis of the land-side extension arm 1.6.

Figure 13:
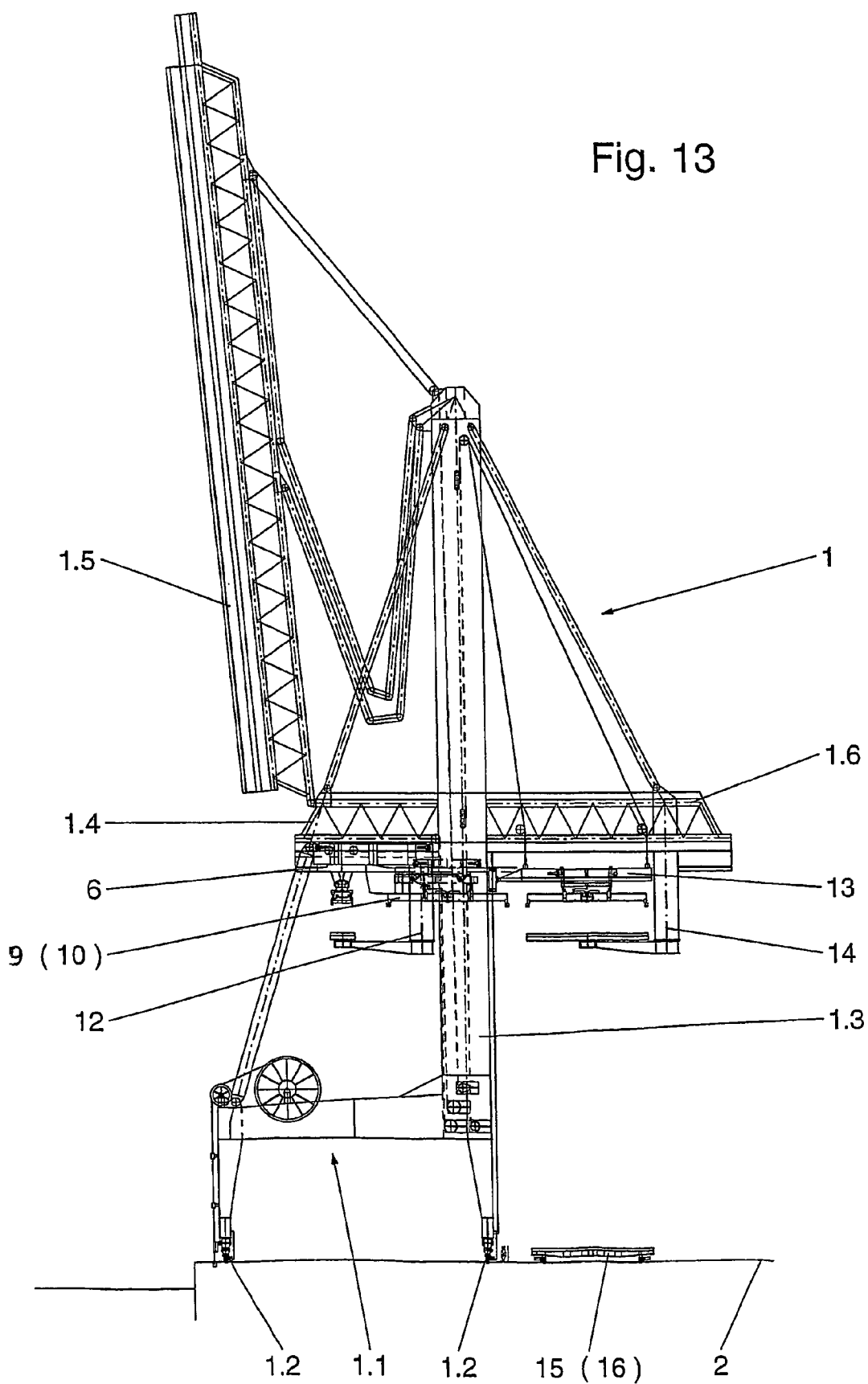
FIG. 13 is a drawing of the crane out of operation.

Finally, in FIG. 13, the transfer plant 1 of the invention is shown in the "out of work" position. All handling gear, such as the trolley 6 with the swivel mechanism 12, the horizontal conveying devices 9 and 10, the vertical hoisting device 13, the swivel mechanism 14 and the container loading stations 15 and 16 are in "out of work" mode. Accordingly, the trolley 6 and the horizontal conveying devices 9 and 10 are driven out onto the rigid extension arm 1.5 at the sea side and the swiveling sea-side extension arm 1.4 has been swiveled up.

A ship unloading process shall now be described; the loading of the ship takes place in the same way, but in reverse sequence.

The novel transfer plant is designed such that, for a loading process on the ship 3, the trolley 6 only has to move horizontally over short distances in order to be positioned above the container 19, preferably, an ISO container. With the spreader 20 as the load suspension means, the container 19 is lifted from the ship 3 to a maximum lift height. The swivel mechanism 12 swivels from the +90° or −90° position into the 0° position. The container 19 is set down on the carrying frame 12.3, and then the swivel mechanism 12 swivels from the 0° position into the −90° position, i.e., in the direction of the one horizontal conveying device 9, or into the +90° position, i.e., in the direction of the other horizontal conveying device 10. At this point, the spreader 32 of the horizontal conveying device 9 or 10 receives the container 19 and transports it horizontally in the direction of the land-side extension arm 1.6. The cable hoisting mechanism of the trolley 6 can activate the next lift independently of this action. At the end of the land-side extension arm 1.6 is the above-described second swivel mechanism 14 with support column 14.1, swivel arm 14.2, and carrying frame 14.3. Here ends the horizontal transport of each horizontal conveying device 9 or 10. The carrying frame 14.3 of the swivel mechanism 14 is located underneath one of the two horizontal conveying devices 9 or 10, so that it can set the container 19 down onto the carrying frame 14.3 with its hoisting mechanism 31. The next part of the downward loading process is taken over by the vertical hoisting device 13 at the landward side of the tower like vertical support 1.3. The swivel mechanism 14 now swivels from the +90° or −90° position into the 0° position and the container is then located under the vertical hoisting device 13. The vertical hoisting device 13 receives the container with its spreader 22 and lifts it. The swivel mechanism 14 again swivels from the 0° position back to the +90° position, i.e., in the direction of one railway 7, or into the −90° position, i.e., in the direction of the other railway 8. The vertical hoisting device 13 now lowers the container to a container loading station 15, 16 standing ready on the dock 2. As soon as the loading process of the container loading station 15, 16 is finished, there occurs the horizontal position change of the stations into the corresponding loading position of the other station. Here, the load is handed off to a horizontal transport system, which can be a driverless transport vehicle 17 or some other transport system, which can pick up the container automatically by means of a spreader. The driverless transport vehicles 17 connect the novel transfer plant to an automatic container storage yard, for example.

LIST OF REFERENCE NUMBERS

1 transfer plant
1.1 gantry
1.2 rail traversing mechanism
1.3 vertical support
1.4 sea-side base arm
1.5 sea-side swivel arm
1.6 land-side extension arm
1.7 cross beam
2 dock
3 container ship
4 cable winches and drive unit
5 railway
6 trolley
7 railway
8 railway
9 horizontal conveying device
10 horizontal conveying device
11 sea-side hoisting and lowering device for containers
12 swivel mechanism
12.1 support column
12.2 swivel arm
12.3 carrying frame
13 land-side hoisting and lowering device for containers
13.1 hoisting beam
13.2 balancing arm
13.3 guide rollers
14 swivel mechanism
14.1 support column
14.2 swivel arm
14.3 carrying frame
15 container loading station
15.1 chassis
15.2 rail traversing mechanisms
16 container loading station
16.1 chassis
16.2 rail traversing mechanisms
17 driverless transport vehicle (FTF)
18 container
19 container
20 spreader
21 container
22 spreader
23 trolley
23.1 rail traversing mechanism
24 load cable
25 guideways
26.1 container
26.2 container
27 rails
28 rails
29 frame
30 rail traversing mechanism
31 hoisting mechanism
32 spreader
33 counterweight
34 coupler mechanism

The invention claimed is:

1. A transfer plant for sea-side and land-side loading and unloading containers from container ships at seaports, comprising:
   a vertical support which is propped up at the land side and a horizontal extension arm braced by said vertical support, wherein said horizontal extension arm protrudes across the ship that is to be unloaded on the sea side; and a horizontal conveying device adapted to travel in a lengthwise direction along said extension arm;

a land-side hoisting and lowering device arranged at the land side and a sea-side hoisting and lowering device arranged at the sea side, each of said land-side and sea-side hoisting and lowering devices adapted to pick up and put down the containers and adapted to cooperate with said conveying device, wherein said land-side and sea-side hoisting and lowering devices are arranged on the horizontal extension arm;

intermediate storage devices that are arranged on said horizontal extension arm in the region of at least one chosen from said land-side and said sea-side hoisting and lowering devices, wherein the containers can be put down or picked up by the land-side or sea-side hoisting and lowering devices, as well as by said horizontal conveying device;

wherein said intermediate storage devices each comprise a downwardly extending support column and a horizontal swivel arm attached at a lower end of said support column and a carrying frame hinged at an end of said swivel arm away from said support column, wherein said carrying frame can swivel both into the region underneath said sea-side or land-side hoisting and lowering device and into the region of said two horizontal conveying devices into corresponding pick-up and hand-off positions for the picking up or handing off of a container; and wherein said conveying device comprises at least two horizontal conveying devices arranged generally side-by-side on said horizontal extension arm in relation to a lengthwise direction of said horizontal extension arm, wherein said at least two horizontal conveying devices are adapted to travel independently of each other and alongside each other between the land-side and sea-side hoisting and lowering devices in said lengthwise direction along said horizontal extension arm, wherein containers on each of said at least two horizontal conveying devices are conveyed generally side-by-side in said lengthwise direction of said horizontal extension arm.

2. The transfer plant per claim 1, wherein said horizontal extension arm comprises a rigid base arm at the sea side, a swivel arm joined to it at the sea side, and a rigid extension arm protruding at the land side; said rigid sea-side base arm and said rigid land-side arm being fastened to said vertical support, wherein said rigid sea-side base arm accommodates said sea-side hoisting and lowering device in a position of rest of the transfer plant, in which said sea-side swivel arm is swiveled upward.

3. The transfer plant per claim 2 including a railway carried by the sea-side portion of said horizontal extension arm, wherein said railway is for movement of a trolley of the sea-side hoisting and lowering device, wherein said land-side hoisting and lowering device is fastened at the land-side portion of said horizontal extension arm, said transfer plant further including other railways for the horizontal conveying devices arranged on both sides next to said railway of the sea-side hoisting and lowering device and next to the land-side hoisting and lowering device essentially along the entire horizontal extension arm.

4. The transfer plant per claim 3, wherein said vertical support is fashioned in the shape of a tower, wherein said railway for the hoisting and lowering device ends in the region of said vertical support, and said other railways for said horizontal conveying devices run laterally past the vertical support.

5. The transfer plant per claim 4, wherein said intermediate storage devices each comprise a downwardly extending support column and a horizontal swivel arm attached at a lower end of said support column and a carrying frame hinged at an end of said swivel arm away from said support column, wherein said carrying frame can swivel both into the region underneath said sea-side or land-side hoisting and lowering device and into the region of said two horizontal conveying devices into corresponding pick-up and hand-off positions for the picking up or handing off of a container.

6. The transfer plant per claim 5 including a parallelogram type coupler mechanism, wherein said swivel mechanism of at least one chosen from said land-side carrying aim and said land-side carrying frame can be driven by said parallelogram type coupler mechanism, so that the orientation of the container remains unchanged during the swivel motion.

7. The transfer plant per claim 5, wherein said carrying frame for the container can be swiveled into a central swivel position between the two pick-up and hand-off positions in the region of said railways, where the container can be connected to or detached from said sea-side or land-side hoisting and lowering device.

8. The transfer plant per claim 5, wherein said sea-side swivel arm and said sea-side carrying frame can each swivel at least ±90° about vertical axis, independently of each other.

9. The transfer plant per claim 8 including a parallelogram type coupler mechanism, wherein said swivel mechanism of at least one chosen from said land-side carrying arm and said land-side carrying frame can be driven by said parallelogram type coupler mechanism, so that the orientation of the container remains unchanged during the swivel motion.

10. The transfer plant per claim 9, wherein said carrying frame for the container can be swiveled into a central swivel position between the two pick-up and hand-off positions in the region of said railways, where the container can be connected to or detached from said sea-side or land-side hoisting and lowering device.

11. The transfer plant per claim 10, wherein said horizontal conveying devices each comprise a frame with a rail traversing mechanism that can travel on said railways, a hoisting mechanism and a spreader to receive the container which has been swiveled and positioned underneath the spreader.

12. The transfer plant per claim 11, wherein said land-side hoisting and lowering device is configured as a lift guided on said vertical support, wherein said lift comprises a trolley, guided on a horizontal hoisting beam, with a load suspension means for the container, wherein said hoisting beam is suspended from hoisting cables and linked by a cross rail to guide rollers that can roll against said vertical support.

13. The transfer plant per claim 12 including hoisting cables of said land-side hoisting and lowering device that are coupled to a mobile counterweight to at least partly compensate for the natural weight of said land-side hoisting and lowering device.

14. The transfer plant per claim 13 including a loading station that is arranged beneath said land-side hoisting and lowering device, said loading station having two pick-up and hand-off positions that can travel alternately underneath said hoisting and lowering device, cooperating with a horizontal conveying system.

15. The transfer plant per claim 14, wherein said transfer plant has a gantry type substructure, supported on said rail traversing mechanisms, wherein said extension arm protrudes across said substructure on the land side, and said vertical support is propped up centrally on said substructure at the land side.

16. The transfer plant per claim 1, wherein said horizontal extension arm comprises a rigid base arm at the sea side, a swivel arm joined to it at the sea side, and a rigid extension arm protruding at the land side; said rigid sea-side base arm and said rigid land-side arm being fastened to said vertical support, wherein said rigid sea-side base arm accommodates said sea-side hoisting and lowering device in a position of rest of the transfer plant, in which said sea-side swivel arm is swiveled upward.

17. The transfer plant per claim 1 including a railway carried by the sea-side portion of said horizontal extension arm, wherein said railway is for movement of a trolley of the sea-side hoisting and lowering device, wherein said land-side hoisting and lowering device is fastened at the land-side portion of said horizontal extension arm, said transfer plant further including other railways for the horizontal conveying devices arranged on both sides next to said railway of the sea-side hoisting and lowering device and next to the land-side hoisting and lowering device essentially along the entire horizontal extension arm.

18. The transfer plant per claim 17, wherein said vertical support is fashioned in the shape of a tower, wherein said railway for the hoisting and lowering device ends in the region of said vertical support, and said other railways for said horizontal conveying devices run laterally past the vertical support.

19. The transfer plant per claim 1, wherein said sea-side swivel arm and said sea-side carrying frame can each swivel at least ±90° about vertical axis, independently of each other.

20. The transfer plant per claim 1, wherein said horizontal conveying devices each comprise a frame with a rail traversing mechanism that can travel on said railways, a hoisting mechanism and a spreader to receive the container which has been swiveled and positioned underneath the spreader.

21. The transfer plant per claim 1, wherein said land-side hoisting and lowering device is configured as a lift guided on said vertical support, wherein said lift comprises a trolley, guided on a horizontal hoisting beam, with a load suspension means for the container, wherein said hoisting beam is suspended from hoisting cables and linked by a cross rail to guide rollers that can roll against said vertical support.

22. The transfer plant per claim 21 including hoisting cables of said land-side hoisting and lowering device that are coupled to a mobile counterweight to at least partly compensate for the natural weight of said land-side hoisting and lowering device.

23. The transfer plant per claim 1 including a loading station that is arranged beneath said land-side hoisting and lowering device, said loading station having two pick-up and hand-off positions that can travel alternately underneath said hoisting and lowering device, cooperating with a horizontal conveying system.

24. The transfer plant per claim 1, wherein said transfer plant has a gantry type substructure, supported on said rail traversing mechanisms, wherein said extension arm protrudes across said substructure on the land side, and said vertical support is propped up centrally on said substructure at the land side.

25. A method of sea-side and land-side loading and unloading of containers from container ships with a vertical support which is propped up at the land side and on which a horizontal extension arm is braced, wherein said extension arm protrudes across the ship that is to be unloaded on the sea side and along which at least two horizontal conveying devices can travel, wherein said conveying device cooperates with hoisting and lowering devices that pick up and put down the containers, said hoisting and lowering devices being arranged at the said hoisting and lowering devices being arranged on said horizontal extension arm at the land side and at the sea side, horizontal conveying devices are arranged generally side-by-side on the horizontal extension arm in relation to a lengthwise direction of said horizontal extension arm and can travel independently of each other between the land-side and sea-side hoisting and lowering devices in said lengthwise direction along the horizontal extension arm, and with intermediate storage devices arranged on the horizontal extension arm in the region of at least one chosen from the land-side and the sea-side hoisting and lowering devices, where containers can be put down or picked up by the land-side or sea-side hoisting and lowering devices, as well as the horizontal conveying devices, the method comprising:

a) for the unloading of containers from a container ship tied up at the dock, providing a spreader and picking up a container by said spreader of the sea-side hoisting and lowering device, which has been positioned on the horizontal extension arm above the container, and raised to a maximum hoisting height, b) providing a horizontally swiveling carrying arm having a horizontally swiveling carrying frame at the intermediate storage device arranged on the sea-side hoisting and lowering device, said carrying arm and carrying frame swiveling from a position of rest underneath a railway of the two horizontal conveying devices into a position underneath the container, c) placing the container down on the carrying frame and swiveling the container along with said carrying frame under one of two side-by-side railways of the horizontal conveying devices, d) positioning at least one of the horizontal conveying devices above the container on the carrying frame receiving the container and transporting the container to the end of the land-side extension arm, while the sea-side hoisting and lowering device picks up a new container, e) handing off the container at the land-side end of the extension arm to a carrying frame of a second intermediate storage device, having a downwardly extending support column and swiveling said carrying frame by a horizontal swivel arm into the region of the railways of the horizontal conveying devices underneath the container, f) after detaching the container from the horizontal conveying device, swiveling the carrying frame with the container under the hoisting mechanism of the hoisting and lowering device hinged to the land-side extension arm and picking up the container by a spreader, g) swiveling the carrying frame back and lowering the container by the hoisting and lowering device and handing off the container to a horizontal conveying system on the ground, h) concurrently with steps a through g, picking up a second container by the sea-side hoisting and lowering device and transporting the second container by a second of the at least two horizontal conveying devices across its other railway to the end of the extension arm at the land side, wherein the second horizontal conveying device is positioned generally side-by-side relative to a first of the horizontal conveying devices, wherein the second container is conveyed generally side-by-side relative to a container on the first conveying device along the lengthwise direction of the horizontal extension arm and is handled in the same fashion, and i) performing the steps a through h in reverse sequence for loading containers on a ship.

26. The method per claim 25, wherein the container that is oriented parallel to the extension arm when placed on the carrying frame of the second land-side hoisting and lowering device remains unchanged in its orientation when swiveled into the region of the hoisting and lowering device as a result of opposite swivel movements of the carrying arm and carrying frame.

27. The method per claim 25, wherein the container that is oriented transversely to the lengthwise axis of the extension arm when picked up by the first hoisting and lowering device is swiveled into a predetermined position parallel to the extension arm by one chosen from the carrying arm and the carrying frame swiveling through +/−90°.

28. The method per claim 27, wherein the container that is oriented parallel to the extension arm when placed on the carrying frame of the second land-side hoisting and lowering device remains unchanged in its orientation when swiveled into the region of the hoisting and lowering device as a result of opposite swivel movements of the carrying arm and carrying frame.

* * * * *

UNITED STATES PATENT AND TRADEMARK OFFICE
CERTIFICATE OF CORRECTION

PATENT NO. : 7,410,339 B2 Page 1 of 1
APPLICATION NO. : 10/526703
DATED : August 12, 2008
INVENTOR(S) : Hermann Franzen and Joachim Kröll It is certified that error appears in the above-identified patent and that said Letters Patent is hereby corrected as shown below:

On the Title Page
Item [57] ABSTRACT:
Page 2, Left Column, Line 5, Delete "," after "1.6)".
Page 2, Right Column, Line 4, "devices" should be --device--.

Column 7:
Line 23, "recieve" should be --receive--.

Column 12:
Line 11, "aim" should be --arm--.

Column 13:
Line 65, Delete "at the said hoisting and lowering devices being arranged" before "on".
Line 65, Insert --wherein said at least two-- after "side,".

Signed and Sealed this

Twenty-fourth Day of February, 2009

JOHN DOLL
*Acting Director of the United States Patent and Trademark Office*